Jan. 16, 1934.   G. E. HULSE   1,943,962
REFRIGERATION
Filed May 9, 1930
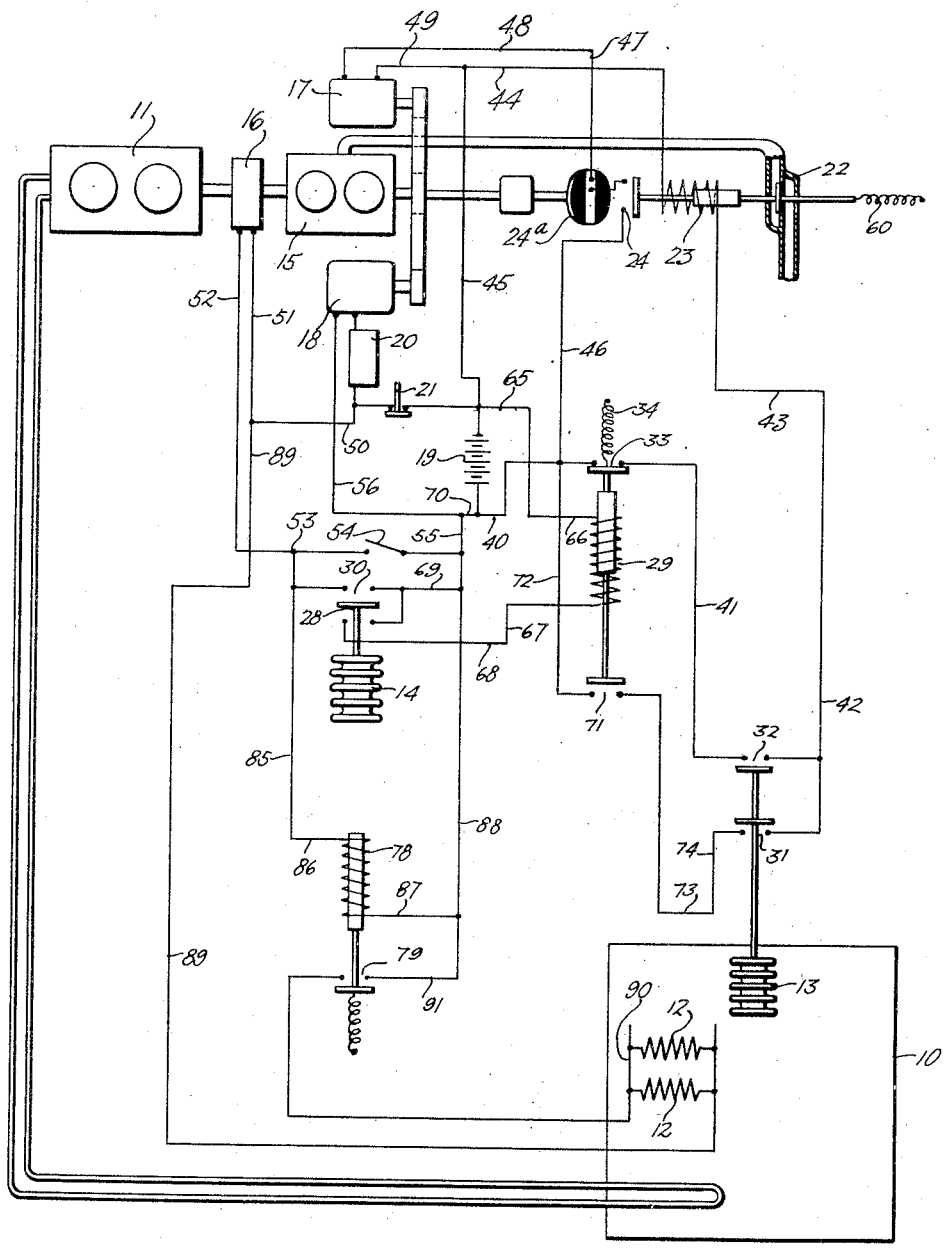
INVENTOR
George E. Hulse
BY
ATTORNEYS Patented Jan. 16, 1934

1,943,962

UNITED STATES PATENT OFFICE 1,943,962

REFRIGERATION

George E. Hulse, New Haven, Conn., assignor to The Safety Car Heating & Lighting Company, a corporation of New Jersey Application May 9, 1930. Serial No. 450,976

26 Claims. (Cl. 236—1)

This invention relates to the art of refrigeration and to systems or apparatus for performing the same.

One of the objects of the invention is to provide a simple and practical method of governing the temperature in the interior of a compartment in which method the exterior temperature is effectively utilized.

Other objects are to provide apparatus for this purpose which will be simple and compact in construction, automatic and efficient in action, and capable of a wide field of usefulness.

Another object is to provide apparatus of this nature which may form a self-contained unit. Other objects will be in part obvious and in part pointed out hereinafter.

The invention accordingly consists in the features of construction, combinations of elements, arrangements of parts and in the several steps and relation and order of the same, all as will be herein illustratively described and the scope of the application of which will be indicated in the following claims.

In the accompanying drawing in which are shown the features of a selected embodiment of this invention:

The drawing is a diagrammatic view.

Referring to the drawing, the system shown is designed to maintain a conditioned space as 10 at a predetermined temperature. This apparatus comprises a refrigerating system of the compression type and including a compressor as 11 and a heating system including a heater as 12 of the electrical resistance type. These systems form a self-contained unit in which the decision whether heat or refrigeration is to be furnished is made by a thermostat as 14 located outside the space and the amount of heat added or subtracted is regulated by a thermostat as 13 within such space. These thermostats are each of the type which expands when the temperature rises above the point at which the thermostat is set and contracts when subjected to a temperature below this point.

The compressor 11 is actuated by an internal combustion engine 15 adapted to be operatively connected thereto by a suitable clutch as 16 which in the form shown is of the magnetic type. To the engine 15 is also operatively connected a suitable starting motor or starter 17 and a generator 18. The generator 18 is connected to a storage battery 19 and a suitable regulator 20 may be provided to hold the generator output constant. A switch as 21 automatically disconnects the generator from the battery when the generator is operating below such a speed as will generate a voltage equal to that of the battery. The supply of fuel to the motor is controlled by a valve 22 actuated by a coil or solenoid 23. This solenoid also directly controls a switch 24. The other details of construction of the unit will best be understood in connection with the operation of the apparatus.

The operation of the refrigeration system will first be considered. Assume that it is desired to maintain the conditioned space at a temperature of approximately 40° F. The thermostats 13 and 14 will then be set at an adjustment to correspond to this temperature. Now let us assume that the temperature outside this space is greater than 40° F. Under these conditions the thermostat 14 will expand, opening the switch at 28, and closing the switch at 30. Now assume that the temperature inside the space 10 is also above 40° F. This will cause the thermostat 13 to expand, opening the switch at 31 and closing the switch at 32. A solenoid switch at 33 is held closed under these conditions by a spring 34 as the solenoid 29 is not energized. I now have current flowing from the battery 19 through the circuit comprising the conductors 45 and 44, solenoid 23, conductors 43 and 42, switch 32, conductor 41, switch 33 and conductor 40. This energizes the solenoid 23 which opens the fuel valve 22 and closes the switch 24. The closing of the switch 24 connects the battery 19 to the starter 17 through the conductors 45, 49, 48, 47, switch 24 and conductors 46 and 40, causing the starter to start the engine 15. The switch 24 may be fitted with a revoluble disc at 24a so that when the engine 15 has reached its normal speed, a suitable centrifugal device (not shown) connected with this engine will turn this disc and break the connection between the battery and the starter.

The operation of the engine 15 drives the generator 18 which will then supply current to the clutch 16 through the regulator 20, conductors 50, 51, 52, 53, switch 54 and conductors 55 and 56, the switch 54 being closed. This energizes the clutch 16, causing the engine 15 to drive the compressor and producing refrigeration in the space 10.

Operation of the compressor will continue until the temperature in the space 10 drops below 40° F., causing the thermostat 13 to contract. The contraction of the thermostat 13 opens the switch 32, closing the switch 31 and deenergizing the solenoid 23. The deenergizing of this solenoid allows a spring 60 to close the fuel valve 22 and stop the engine 15. The stopping of the engine stops the compressor and these will remain at rest until the temperature in the space 10 rises above 40°, causing the thermostat 13 to again expand and close the switch 32, in which case the compressor will be operated as before.

If the system is to act as a combined heating and cooling system the switch 54 is opened. Under these conditions if the outside temperature falls below 40° F. the thermostat 14 will contract, closing the switch 28 and opening the switch 30. This will permit the battery current to flow through the solenoid 29 by way of the conductors 65, 66, 67, 68, switch 28 and conductors 69, 55 and 70. The energizing of this solenoid opens switch 33 and closes switch 71 connected thereto.

If the temperature in the space 10 now falls below 40°, the thermostat 13 will contract and close the switch 31, opening the switch 32, and allowing current to pass from the battery through the solenoid 23 by way of the conductors 45, 44, 43, 42, switch 31, conductors 74, 73, switch 71, conductors 72 and 40. The energizing of this solenoid 23 closes the switch 24 and opens the fuel supply valve 22, connecting the starter 17 and starting the engine 15 as before. When the engine comes up to speed, the starter will be disconnected as previously described.

In this condition, the opening of the switch 30 and closing of the switch 28 as described allows the solenoid 78 to be energized and the switch 79 to be closed through the generator circuit comprising conductors 50 and 51, clutch 16 and conductors 52, 53, 85, 86, 87, 88, 55 and 56. The coil 78 and the clutch coil in this circuit so reduce the current therein that there is insufficient to operate the clutch and the compressor remains inoperative. Thus no refrigeration takes place in the space 10. The closing of the switch at 79 causes the heater units 12 to become operative through the generator circuit comprising the conductors 50, 89 and 90, switch 79 and conductors 91, 88, 55 and 56. This will cause the space 10 to be heated until the temperature therein has risen sufficiently to cause the thermostat 13 to expand, opening the switch 31, de-energizing the solenoid 23 and allowing the fuel valve 22 to close. The shutting off of the fuel stops the operation of the engine and it will remain inactive until such time as the temperature in the space 10 drops sufficiently to cause the engine to be again started by the action of the thermostat 13 in the manner previously described.

It will be evident from the foregoing description that the decision whether the space 10 shall be heated or refrigerated is made by the thermostat 14 outside such space and the control of the heat added by the heater or abstracted by the refrigerating apparatus rests in the thermostat 13 within such space.

The entire apparatus is simple in construction and capable of withstanding the exacting conditions of commercial use. Such apparatus may be entirely self-contained so that it requires no external source of power supply and thus may be effectively used on railway cars, trucks and the like or under conditions which would preclude the use of other apparatus for the same general purpose.

It will be seen that this invention comprises an art and an apparatus, both of an essentially practical nature in which the several objects referred to are attained.

As the art herein described may be carried out in various ways and as the apparatus may be materially changed without departing from the scope of the invention, it is to be understood that all matter herein set forth or shown in the accompanying drawing is to be interpreted as illustrative and not in a limiting sense.

I claim:

1. In apparatus for conditioning a space, a cooling system, means responsive to temperature without said space for controlling the actuation of said system, and means responsive to the temperature within the space for regulating the operation of the system.

2. In a system for conditioning a space, heating apparatus for said space, means responsive to the temperature without said space for controlling the action of said apparatus, and means controlled by temperature within said space for regulating the operation of said apparatus.

3. In a system for conditioning a space, refrigerating apparatus including means acting to maintain said apparatus in condition to operate while the temperature without the space is above a predetermined point and to render the same inoperable when said temperature is below such point, the standard of operation of said apparatus being controlled by temperature within the space.

4. In a system for conditioning a space, refrigerating apparatus including means acting to maintain said apparatus in condition to operate while the temperature without the space is above a predetermined point and to render the same inoperable when said temperature is below such point, and means controlled by the temperature within the space for controlling the operation of said apparatus.

5. In a system for conditioning a space, refrigerating apparatus including a compressor, an internal combustion engine operating said compressor, and means jointly controlled by the temperature within said space and the atmospheric temperature prevailing outside said space for controlling the operation of said compressor.

6. In apparatus for refrigerating a space, a self-contained refrigerating unit for said space including a compressor, an internal combustion engine for operating said compressor, and controlling means for said engine and said compressor jointly controlled by the temperature within and without said space, said temperature without the space being unaffected by said apparatus.

7. In apparatus for refrigerating a space, a self-contained refrigerating unit including a compressor, an internal combustion engine for operating said compressor, means controlled by temperature conditions without said space for placing said unit in condition to operate, said last-mentioned temperature conditions being unaffected by said apparatus and means subordinate to the first means acting to automatically control the standard of operation of said engine and said compressor in accordance with temperature conditions within said space.

8. In apparatus for refrigerating a space, a self-contained refrigerating unit including a compressor, an internal combustion engine for operating said compressor, and means including a magnetic clutch interposed between said engine and said compressor for automatically controlling said unit in accordance with conditions within and without said space.

9. In apparatus for refrigerating a space, a self-contained unit including a compressor, an internal combustion engine, a magnetic clutch for operatively connecting said compressor and said engine, a starting motor for said engine, a generator driven by said engine, and controlling means for said unit jointly controlled by the temperature within and without said space.

10. In a system for conditioning a space, refrigerating apparatus including a compressor, an internal combustion engine operating said compressor, and means jointly controlled by the temperature within the space and the temperature outside the space for controlling the operation of said engine, said outside temperature being unaffected by said apparatus.

11. In a system of the character described, in combination, a space whose temperature is to be affected, a refrigeration unit for said space, an engine for driving elements of said unit, means for controlling the fuel supplied to said unit, and means responsive to the temperatures inside said space and outside said space for actuating said fuel control means.

12. In a system of the character described, in combination, a space whose temperature is to be affected, a refrigeration unit for said space, an engine for driving certain parts of said refrigeration unit, means for controlling the fuel supplied to said engine, and means responsive to the condition of said space for regulating said fuel control means.

13. In a system of the character described, in combination, a space whose condition is to be affected, means for affecting the condition of said space, an engine for driving certain parts of said last-mentioned means, and means for controlling the operation of said engine in accordance with the conditions within said space and outside said space, said outside condition being unaffected by said first-mentioned means.

14. In a system of the character described, in combination, a space whose condition is to be affected, means for affecting the condition of said space, an engine for driving certain parts of said last-mentioned means, means for controlling the fuel supplied to said engine, and means for regulating the operation of said last-mentioned means in accordance with the conditions within said space and outside said space.

15. In a system of the character described, in combination, a space, means for affecting the condition of said space, an engine for driving certain parts of said last-mentioned means, electrically actuated means for controlling the fuel supplied to said engine, a source of current, and means for controlling a circuit between said source of current and said electrically actuated means in accordance with conditions within said space and outside said space.

16. In a system of the character described, in combination, a space, a cooling unit for said space, an internal combustion engine for actuating certain parts of said cooling unit, a source of fuel for said engine, means for controlling the flow of fuel to said engine, and means including a thermostat within said space and a thermostat outside said space for regulating the operation of said last-mentioned means, said outside thermostat being unaffected by the operation of said cooling unit.

17. In a system of the character described, in combination, a space, a refrigeration unit for said space, an internal combustion engine adapted to drive an element of said refrigeration unit, electric starting means for said engine, a source of current, means responsive to the temperatures within said space and outside said space for controlling a circuit between said starting means and said source of current, and means responsive to the starting of said engine for stopping said starting means.

18. In a system of the character described, in combination, a space whose temperature is to be affected, means for affecting the temperature of said space, motive means, and means responsive to the temperatures within said space and outside said space for connecting and disconnecting said motive means with certain parts of said first-mentioned means.

19. In a system of the character described, in combination, a space, a cooling unit for said space, a heating unit for said space, motive means, and means responsive to the temperatures within said space and outside said space for controlling the operation of said heating unit, said last-mentioned means controlling the connection between said motive means and an element of said cooling unit.

20. In a system of the character described, in combination, a space, a refrigeration unit for said space, an internal combustion engine, an electrically actuated clutch disposed between said engine and an element of said refrigeration unit, a source of current, and means responsive to the temperatures within said space and outside said space for controlling a circuit between said source of current and said clutch, said last-mentioned means adapted to control the actuation of said engine.

21. In apparatus for conditioning a space, in combination, a space whose temperature is to be regulated, a refrigeration unit including a compressor for said space, motive means for driving said compressor, an electrically actuated clutch interposed between said compressor and said motive means, electrical heating means for said space, a generator, means forming a driving connection between said generator and said motive means, a source of current, means forming a circuit between said source of current and said electrical clutch, means forming a circuit between said electrical heating means and said generator, a switch for controlling said circuits in accordance with its position, and a thermostat outside said space for controlling the position of said switch.

22. In apparatus for conditioning a space, in combination, a space whose temperature is to be regulated, a refrigeration unit including a compressor for said space, heating means for driving said compressor, an electrically actuated clutch interposed between said compressor and said motive means, electrical heating means for said space, a generator, means forming a driving connection between said generator and said motive means, a source of current, means forming a circuit between said source of current and said electrical clutch, means forming a circuit between said electrical heating means and said generator, a switch for controlling said circuits in accordance with its position, a thermostat outside said space for controlling the position of said switch, and a thermostat responsive to the temperature within said space for controlling the operation of said motive means.

23. In apparatus for conditioning a space, in combination, means forming a space whose temperature is to be regulated, a refrigeration unit for said space, an internal combustion engine, means forming a driving connection between said internal combustion engine and an element of said refrigeration unit, a clutch disposed in said last-mentioned means, electrical heating means for said space, a generator, means forming a driving connection between said generator and said engine, means responsive to the temperature outside said space for selectively controlling the operation of said clutch and the circuit between said generator and said electrical heating means, and means responsive to the temperature inside said space for controlling the standard of operation of said engine.

24. In apparatus for conditioning a space, in combination, means forming a space whose temperature is to be regulated, a refrigeration unit for said space, an internal combustion engine, means forming a driving connection between said internal combustion engine and an element of said refrigeration unit, a clutch disposed in said last-mentioned means, electrical heating means for said space, a generator, means forming a driving connection between said generator and said engine, means responsive to the temperature outside said space for selectively controlling the operation of said clutch, a circuit between said generator and said electrical heating means, and means responsive to the temperature inside said space for controlling the starting of said engine and the fuel supplied to said engine.

25. In apparatus for conditioning a space, in combination, means forming a space whose temperature is to be regulated, a refrigeration unit for said space, an internal combustion engine, means forming a driving connection between said engine and an element of said refrigeration unit, an electrical clutch disposed in said last-mentioned means, an electrical heating unit for said space, a starting motor for said engine, a source of current, a generator, means forming a driving connection between said engine and said generator, a circuit between said generator and said heating means, a circuit between said source of current and said clutch, a switch in said last two mentioned circuits and adapted to make or break each circuit according to its position, a thermostat responsive to the temperature outside said space for controlling the position of said switch, a starting motor for said engine, a circuit between said source of current and said starting motor, a switch in said last-mentioned circuit, and a thermostat within said space adapted to control the opening and closing of said switch.

26. In apparatus for conditioning a space, in combination, means forming a space whose temperature is to be regulated, a refrigeration unit for said space, an internal combustion engine, means forming a driving connection between said engine and an element of said refrigeration unit, an electrical clutch disposed in said last-mentioned means, an electrical heating unit for said space, a starting motor for said engine, a source of current, a generator, means forming a driving connection between said engine and said generator, a circuit between said generator and said heating means, a circuit between said source of current and said clutch, a switch in said last two mentioned circuits and adapted to make or break each circuit according to its position, a thermostat responsive to the temperature outside said space for controlling the position of said switch, a starting motor for said engine, a circuit between said source of current and said starting motor, a switch in said last-mentioned circuit, electrical means for controlling the supply of fuel to said engine, a circuit between said source of current and said last-mentioned electrical means, a switch for controlling said last two mentioned circuits according to its position, and means responsive to the temperature within said space for controlling the position of said switch.

GEORGE E. HULSE.